US006344959B1

(12) United States Patent
Milazzo

(10) Patent No.: US 6,344,959 B1
(45) Date of Patent: Feb. 5, 2002

(54) METHOD FOR SENSING THE OUTPUT VOLTAGE OF A CHARGE PUMP CIRCUIT WITHOUT APPLYING A LOAD TO THE OUTPUT STAGE

(75) Inventor: Ciro W. Milazzo, Santa Cruz, CA (US)

(73) Assignee: Unitrode Corporation, Merrimack, NH (US)

( * ) Notice: Subject to any disclaimer, the term of this patent is extended or adjusted under 35 U.S.C. 154(b) by 0 days.

(21) Appl. No.: 09/302,826

(22) Filed: Apr. 30, 1999

Related U.S. Application Data

(60) Provisional application No. 60/083,776, filed on May 1, 1998.

(51) Int. Cl.[7] ................................................. H02H 3/00
(52) U.S. Cl. ............................ 361/92; 361/18; 361/90; 361/115
(58) Field of Search .......................... 361/92, 18, 115, 361/100, 90

(56) References Cited

U.S. PATENT DOCUMENTS

| | | | |
|---|---|---|---|
| 4,291,366 A | 9/1981 | Nelson | 363/17 |
| 4,670,861 A | 6/1987 | Shu et al. | 365/181 |
| 4,752,699 A * | 6/1988 | Cranford | 307/297 |
| 4,792,705 A | 12/1988 | Ouyang et al. | 307/296 R |
| 4,870,553 A | 9/1989 | Brown | 363/16 |
| 4,883,976 A | 11/1989 | Deane | 307/291.2 |
| 4,897,774 A | 1/1990 | Bingham et al. | 363/61 |
| 4,926,354 A | 5/1990 | Pattantyus | 363/98 |
| 5,039,877 A | 8/1991 | Chern | 307/296.2 |
| 5,075,572 A | 12/1991 | Poteet et al. | 307/350 |
| 5,119,265 A | 6/1992 | Qualich et al. | 361/103 |
| 5,128,560 A | 7/1992 | Chern et al. | 307/475 |
| 5,196,739 A | 3/1993 | Sandhu et al. | 307/296.1 |
| 5,301,097 A | 4/1994 | McDaniel | 363/60 |
| 5,363,333 A | 11/1994 | Tsujimoto | 365/201 |
| 5,422,529 A | 6/1995 | Lee | 327/536 |
| 5,422,590 A | 6/1995 | Coffman et al. | 327/537 |
| 5,426,776 A | 6/1995 | Erdman | 395/575 |
| 5,475,335 A | 12/1995 | Merrill et al. | 327/536 |
| 5,481,221 A | 1/1996 | Gariboldi et al. | 327/536 |
| 5,498,914 A | 3/1996 | De Boer | 307/116 |
| 5,534,821 A | 7/1996 | Akiyama et al. | 331/8 |
| 5,539,610 A | 7/1996 | Williams et al. | 361/246 |
| 5,581,455 A | 12/1996 | Rossi et al. | 363/60 |
| 5,587,680 A | 12/1996 | Smith | 327/291 |
| 5,592,370 A | 1/1997 | Rogers | 363/60 |
| 5,612,861 A | 3/1997 | Zhong et al. | 363/59 |

* cited by examiner

*Primary Examiner*—Stephen W. Jackson
(74) *Attorney, Agent, or Firm*—Weingarten, Schurgin, Gagnebin & Hayes LLP

(57) ABSTRACT

The presently disclosed method and apparatus provides the sensing of an output voltage of a charge pump without applying a load to the output stage. In the charge pump the voltage change which occurs across a capacitor of a stage of the charge pump when the charge pump transfers charge to the next stage is proportional to the difference between the voltage at the output of the charge pump under load, and the voltage which will be developed at the output of the charge pump with no load. There is an interval in the timing of the charge pump cycle after the first stage capacitor has transferred its charge to a second stage capacitor where the high side of the first capacitor has not yet been connected to the line voltage. During this interval the charge pump undervoltage detection circuit measures the voltage at the high side of the capacitor and compares this measured voltage to a reference voltage. When the voltage at the high side of the capacitor is below the reference voltage, it can be accurately inferred that the voltage at the output of the charge pump is more than a certain voltage below what the output voltage would be if it was unloaded. The amount that the output voltage is below its maximum value is directly related to the output current. In such a manner the output voltage of the charge pump is sensed without using a resistive or capacitive voltage divider thereby improving the efficiency of the charge pump.

14 Claims, 4 Drawing Sheets

METHOD FOR SENSING THE OUTPUT VOLTAGE OF A CHARGE PUMP CIRCUIT WITHOUT APPLYING A LOAD TO THE OUTPUT STAGE

CROSS REFERENCE TO RELATED APPLICATIONS

This application claims priority under 35 U.S.C. § 119(e) to provisional patent application serial No. 60/083,776 filed May 1, 1998; the disclosure of which is incorporated herein by reference.

STATEMENT REGARDING FEDERALLY SPONSORED RESEARCH OR DEVELOPMENT

Not Applicable

BACKGROUND OF THE INVENTION

Charge pumps are known in the art. A charge pump comprises a series of charge transfer elements, each of which increase the output voltage by a quantity of approximately 1*Vin. The charges are integrated over complete clock cycles. Typically a resistive or capacitive voltage divider is provided at the output stage of the charge pump in order to sense the output of the charge pump. The resistive or capacitive voltage divider draws a certain amount of current, thus reducing the efficiency of the charge pump. It would be desirable to find a measurable quantity in the charge pump which is also related to output current in order to sense the output of the charge pump without applying a load to the output stage thereby improving the efficiency of the charge pump.

BRIEF SUMMARY OF THE INVENTION

The presently disclosed method and apparatus provide the sensing of an output voltage of a charge pump without applying a load to the output stage. In the charge pump the voltage change which occurs across a capacitor of a stage of the charge pump when the charge pump transfers charge to the next stage is proportional to the difference between the voltage at the output of the charge pump under load, and the voltage which will be developed at the output of the charge pump with no load. There is an interval in the timing of the charge pump cycle after the first stage capacitor has transferred its charge to a second stage capacitor where the high side of the first stage capacitor has not yet been connected to the line voltage. During this interval the charge pump undervoltage detection circuit measures the voltage at the high side of the capacitor and compares this measured voltage to a reference voltage. When the voltage at the high side of the capacitor is below the reference voltage, it can be accurately inferred that the voltage at the output of the charge pump is more than a certain voltage below what the output voltage would be if it was unloaded. The amount that the output voltage is below its maximum value is directly related to the output current. In such a manner the output voltage of the charge pump is sensed without using a resistive or capacitive voltage divider thereby improving the efficiency of the charge pump.

BRIEF DESCRIPTION OF THE SEVERAL VIEWS OF THE DRAWING

The invention will be more fully understood from the following detailed description taken in conjunction with the accompanying drawings in which.

DETAILED DESCRIPTION OF THE INVENTION

A charge pump comprises a series of charge transfer elements, each increasing the output voltage by a quantity equal to the input voltage (Vin) when integrated over many complete clock cycles. For example, a two stage charge pump having five volts as an input would provide approximately fifteen volts (Vin plus the two stages multiplying Vin). Each charge transfer element adds an equivalent source resistance of $1/(f*C)$ (where f=oscillator frequency and C=charge pump capacitor values). If there are n stages in the charge pump, the unloaded output voltage will be:

$$\text{Voutmax}=(n+1)*\text{Vin} \tag{1}$$

and the output resistance will be:

$$\text{Rout}=n/(f*C). \tag{2}$$

If there is a steady state output current ILOAD, the output voltage Vout will drop below Voutmax by:

$$\Delta\text{Vout}=\text{Voutmax}-\text{Vout}=\text{ILOAD}*\text{Rout}=\text{ILOAD}*n/(f*c). \tag{3}$$

Figure 1:
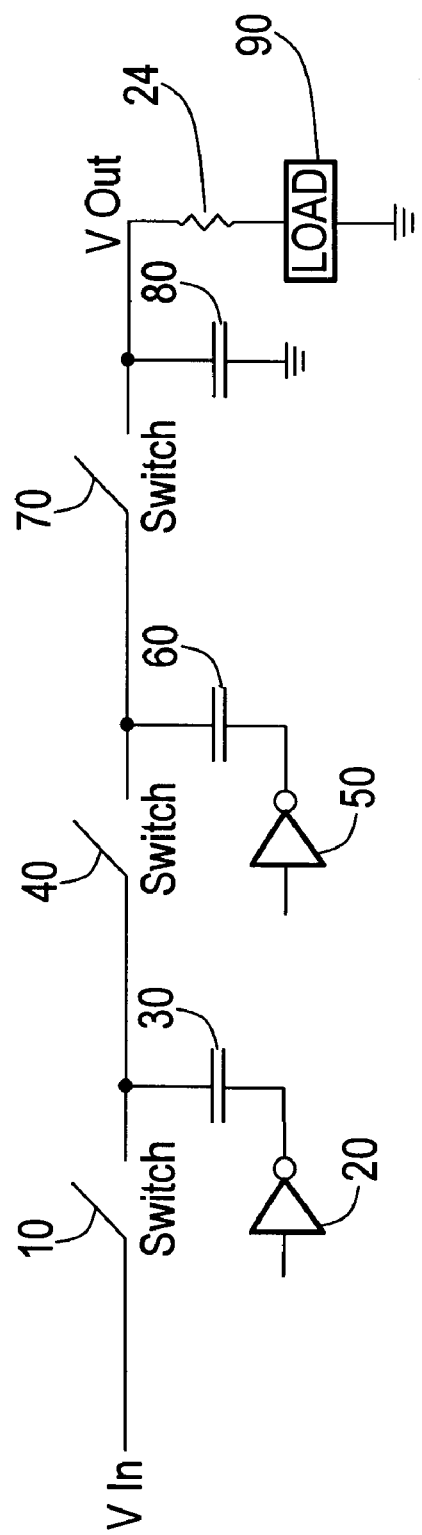
FIG. 1 is a schematic diagram of a prior art charge pump.

As shown in FIG. 1 a prior art charge pump 1 comprises a first driver 20 which drives a first lead of a first capacitor 30. The second lead of the capacitor 30 is connected between a first switch 10 and a second switch 40. First switch 10 connects Vin to the second lead of capacitor 30. A second driver 50 drives a first lead of second capacitor 60. The second lead of capacitor 60 is connected between the second switch 40 and a third switch 70. Second switch 40 connects between the second end of capacitor 30 and the second lead of capacitor 60. A third switch 70 is connected between the second lead of capacitor 60 and to either a reservoir cap or to additional stages (not shown).

Operation of the charge pump can be described as including eight steps. At step 1 switch 40 is open. In the next step (step 2) an input to driver 20 is at a high voltage level, resulting in the output of driver 20 being low. In step 3 the input to driver 50 is set high, thus driver 50 is outputting a low voltage. Next switch 10 is closed thereby allowing first capacitor 30 to be charged to a value of approximately Vin. Next, at step 5, switch 10 is opened. At step 6 the input to driver 20 is then set low, resulting in the output of the driver becoming high (approximately five volts). Next the input to driver 50 is set high, causing driver 50 to output a low voltage. At step 8 switch 40 is then closed which in turn level shifts the voltage at the second lead of capacitor 30 by five volts to approximately ten volts with respect to Vss. This process is repeated such that after several cycles capacitor 60 will be charged to a voltage of approximately twice Vin. Switch 70 is synchronized with switch 10, such that switch 70 transfers charge to reservoir capacitor 80. Reservoir capacitor 80 provides steady state current to any load on the charge pump. A sense resistor 24 is shown between the output of the charge pump and the load 90. The sense resistor 24 senses the load current supplied to the load 90. The sense resistor 24 draws some amount of current from the charge pump and thus reduces the efficiency of the charge pump.

Figure 2:
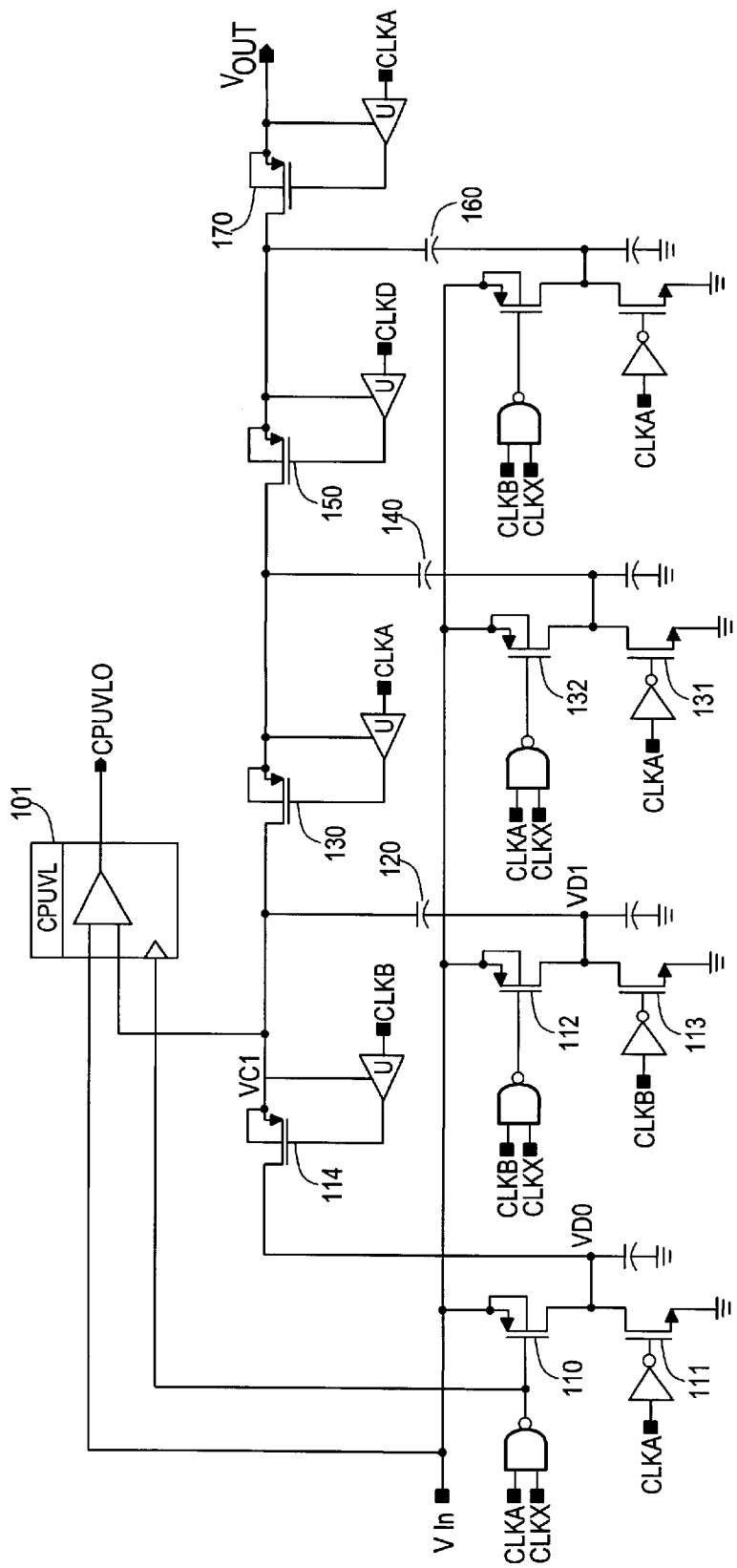
FIG. 2 is a schematic diagram of a charge pump undervoltage detection circuit of the present invention.
Figure 3:
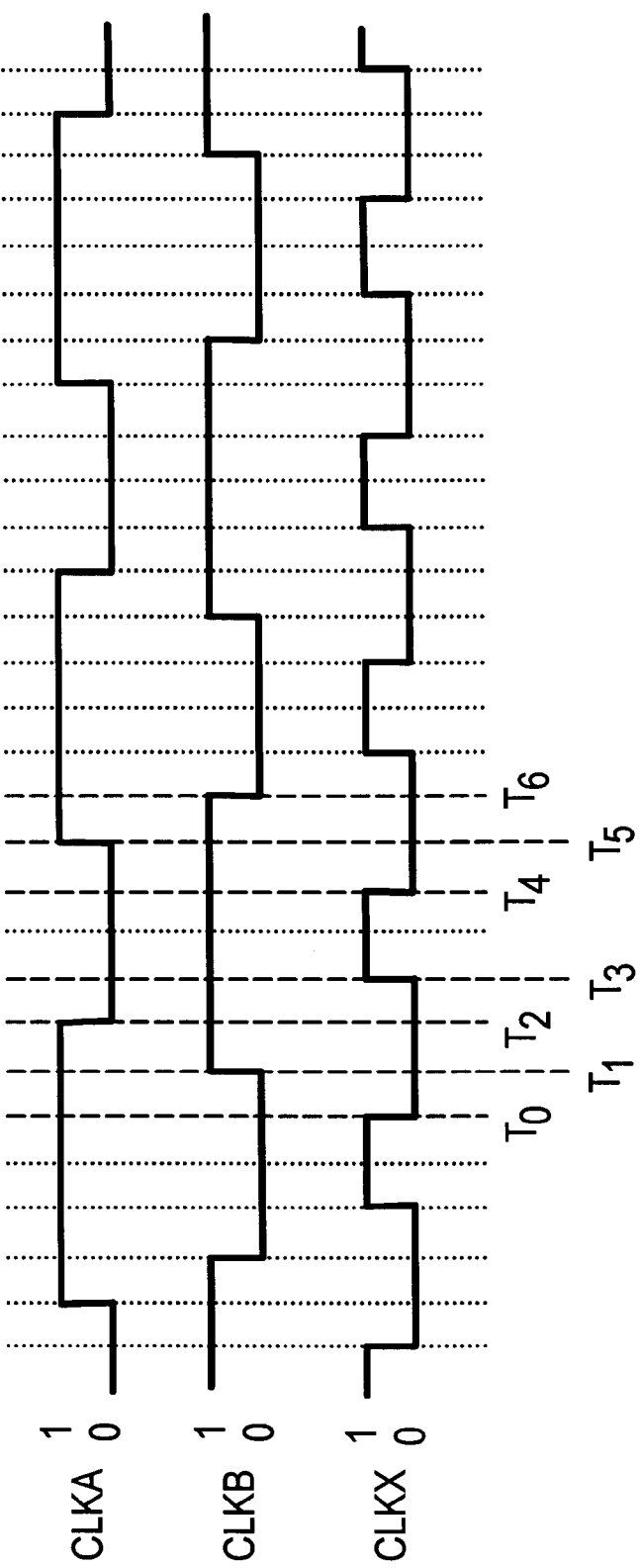
FIG. 3 is a timing diagram for the charge pump of FIG. 2.

Referring now to FIGS. 2 and 3 a charge pump utilizing the presently disclosed method and apparatus is presented.

Initially, at $T_0$, CLKA is at a high level, CLKB is at a low level while CLKX is toggled from a logic high level to a logic low level. As a result of values of CLKA, CLKB and the transition of CLKX, switch 110 is transitioned from an on state to an off state by the switch having previously supplied approximately 4.0 volts to the VD0 node. Switch 111 is off, thereby allowing the VD0 node to go to approximately 4.0 volts. Switch 112 is off and switch 113 is on, thereby pulling the VD1 node to approximately ground level. Switch 114 is on and switch 130 is off, thus capacitor 120 is charged to approximately 4.0 volts and supplies this voltage to node VC1. Node VC1 is monitored by the charge pump under voltage detection circuit (CPUVLO). Charge has just been transferred to capacitor 120, and charge has also been transferred from capacitor 140 to capacitor 160.

Thereafter, at $T_1$ CLKB is toggled from a logic low level to a logic high level. CLKA remains at a logic high level. As a result of the transition of CLKB switch 114 is now turning off, which will effectively isolate capacitor 120 from switches 110 and 111.

At $T_2$ CLKA is transitioned from a logic high level to a logic low level, resulting in switches 130, 131 and 111 being switched from an open condition to a closed condition. As a result, capacitor 120 is now in electrical communication with capacitor 140.

At $T_3$ CLKX has transitioned from a logic low level to a logic high level. As a result of the transition of CLKX, switch 112 is closed, level shifting the voltage at node VC1 by approximately four volts, up to approximately 8.0 volts with respect to ground. Node VC2 will also be set to this value by the charging of capacitor 140.

At $T_4$, CLKX has transitioned from a logic high level to a logic low level. As a result of the transition of CLKX, switch 112 is opened thereby stopping the transfer of charge from capacitor 120 to capacitor 140.

At $T_5$ CLKA is transitioned from a logic low level to a logic high level. As a result of the transition of CLKA, switch 130 is opened, thus capacitor 120 is no longer in electrical communication with capacitor 140. Switch 131 is also opened, thus removing the ground path to the capacitor 140.

At $T_6$ CLKB is transitioned from a logic high level to a logic low level. As a result of the transition of CLKB switches 114, 113 and 150 are closed.

During the charge pump cycling described above, there is a timing interval, indicated by $T_6$, wherein charge has been transferred from capacitor 120 to capacitor 140, and capacitor 120 has not yet been connected to node Vin. During the interval from $T_6$ through the time when CLKX rises, the voltage at the top of capacitor 120 (VC1) is sensed by the CPUVLO circuitry 101.

The amount that the output voltage of the charge pump is below its maximum value is directly related to the output current. The voltage change induced on capacitor 120 when it transfers charge to capacitor 140 from $T_3$ through $T_6$ is a measurable quantity which is also related to output current (Iload).

Iload can be related to packets of charge, q, by:

$$ILOAD = q*f$$

therefore:

$$\Delta Vout = (q*f)*n/(f*c) = (q*n)/c \quad (4)$$

In the steady state, each stage of the charge pump must transfer charge to the next stage on each clock cycle. If ΔVcap is the voltage change across the capacitor from just before to just after the transfer of charge q, then $$\Delta Vcap = q/c \quad (5)$$

combining equations (4) & (5):

$$\Delta Vcap = \Delta Vout/n$$

Prior to transferring charge q from capacitor 120 to capacitor 140, switches 110, 113, and 114 are closed setting the voltage on capacitor 120 equal to Vin. After transferring charge q from capacitor 120 to capacitor 140, and after closing switch 113 but prior to closing switch 110, the voltage on capacitor 120, and hence the voltage on node VC1, will be Vin−q/c. Thus if the voltage on VC1 at that time is compared to the voltage at Vin, the difference will be equal to $\Delta Vcap = q/c$.

Figure 4:
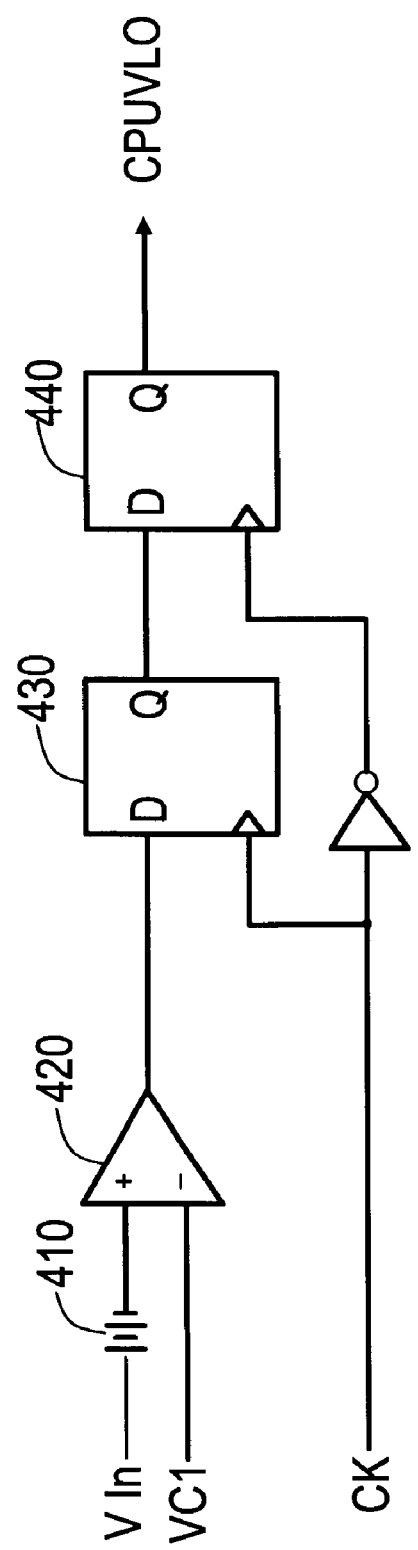
FIG. 4 is a schematic diagram of the CPUVLO circuitry.

The CPUVLO circuitry 101 is shown in FIG. 4. The offset voltage 410 sets a reference against which Δcap is compared. The comparator 420 compares the voltage on node VC1 to the voltage on Vin less the reference voltage 410. The clock signal CK causes transparent latch 430 to latch the output state of comparator 420 at the time after transferring charge q from capacitor 120 to capacitor 140, and after closing switch 113 but just prior to closing switch 110. The clock for transparent latch 440 is antiphase to the clock for latch 430. Latch 440 holds the last latched state of latch 430 during the time when comparator 420 output is settling. Transparent latches 430 and 440 perform the function of a falling edge triggered D flip flop.

On initial start up of the charge pump, or after a very large current load has diminished the charge pump output voltage, ΔVout will be greater than n times the reference voltage 410, and ΔVc1 will be greater than the reference voltage 410. In this case the output of the comparator 420 will be high, and the CPUVLO output will be high indicating that an undervoltage condition exists. If the charge pump output voltage rises, at the time when ΔVc1 becomes less than the reference voltage 410 the output of the comparator 420 will become low, and the CPUVLO output will become low indicating that the undervoltage condition no longer exists.

In such a manner the output voltage of the charge pump has been sensed without applying any load to the charge pump. Since a load is not required to sense the output of the charge pump, the efficiency of the charge pump is improved over a charge pump in which a resistive divider or other load is used to sense the output of the charge pump.

Having described preferred embodiments it will now become apparent to one of ordinary skill in the art that other embodiments incorporating these concepts could also be used. Accordingly, it is submitted that the invention should not be limited to the described embodiments but rather should be limited only by the scope and spirit of the appended claims.

I claim:

1. A method of sensing an output voltage of a charge pump without applying a load to an output stage of the charge pump comprising the steps of:

establishing a reference voltage;

sensing with an undervoltage detector a voltage on a first side of a first stage charge pump capacitor related to the output voltage of said charge pump;

comparing the sensed voltage to the reference voltage with said undervoltage detector; and detecting said undervoltage condition of the charge pump based on the comparison between the sensed voltage and the reference voltage.

2. The method of claim 1 wherein the step of sensing is performed after said first stage charge pump capacitor has transferred charge to a second stage charge pump capacitor and before the first side of said first stage charge pump capacitor has been placed in electrical communication with an input voltage.

3. The method of claim 1 wherein the step of establishing a reference voltage establishes a reference voltage which has a lower value than an input voltage to said charge pump.

4. A charge pump comprising:

a first capacitor having a first contact and a second contact;

a first device having an input and an output, the output in electrical communication with the first contact of said first capacitor;

a first switch having a source in electrical communication with an input voltage, a drain in electrical communication with said second contact of said first capacitor, and a gate operative to selectively provide electrical communication between said drain and said source;

a second capacitor having a first contact and a second contact;

a second device having an input and an output, the output in electrical communication with the first contact of said second capacitor;

a second switch having a source in electrical communication with the second contact of said first capacitor, a drain in electrical communication with said second contact of said second capacitor, and a gate operative to selectively provide electrical communication between said drain and said source; and an undervoltage detection circuit in communication with the second contact of said first capacitor.

5. The charge pump of claim 4 wherein said first switch comprises a PMOS switch.

6. The charge pump of claim 4 wherein said second switch comprises a PMOS switch.

7. The charge pump of claim 4 wherein said first device comprises a driver.

8. The charge pump of claim 4 wherein said second device comprises a driver.

9. The charge pump of claim 4 wherein said first device comprises a switch.

10. The charge pump of claim 4 wherein said second device comprises a switch.

11. The charge pump of claim 4 wherein said first device comprises a transistor.

12. The charge pump of claim 4 wherein said second device comprises a transistor.

13. The method of claim 1 further including the steps of, electrically communicating an output of a first device with a second side of said first stage charge pump capacitor, selectively providing electrical communication between a drain and a source of a first switch operative by a gate of said first switch when said source is in electrical communication with an input voltage, electrically communicating an output of a second device with a first side of a second stage charge pump capacitor, and selectively providing electrical communication between a drain and a source of a second switch operative by a gate of said second switch when said source is in electrical communication with said first side of said first stage charge pump capacitor.

14. The method of claim 1 wherein said undervoltage detector detects said undervoltage condition when the sensed voltage is greater than said reference voltage.

* * * * *